July 14, 1959 T. G. HOLMES 2,894,686

BINARY CODED DECIMAL TO BINARY NUMBER CONVERTER

Filed Sept. 1, 1954

INVENTOR.
THOMAS G. HOLMES
BY James S. Shannon
AGENT
and
Wade Koontz
ATTY.

United States Patent Office 2,894,686

Patented July 14, 1959

2,894,686

BINARY CODED DECIMAL TO BINARY NUMBER CONVERTER

Thomas G. Holmes, Melbourne, Fla.

Application September 1, 1954, Serial No. 453,708

6 Claims. (Cl. 235—155)

Figure 2:
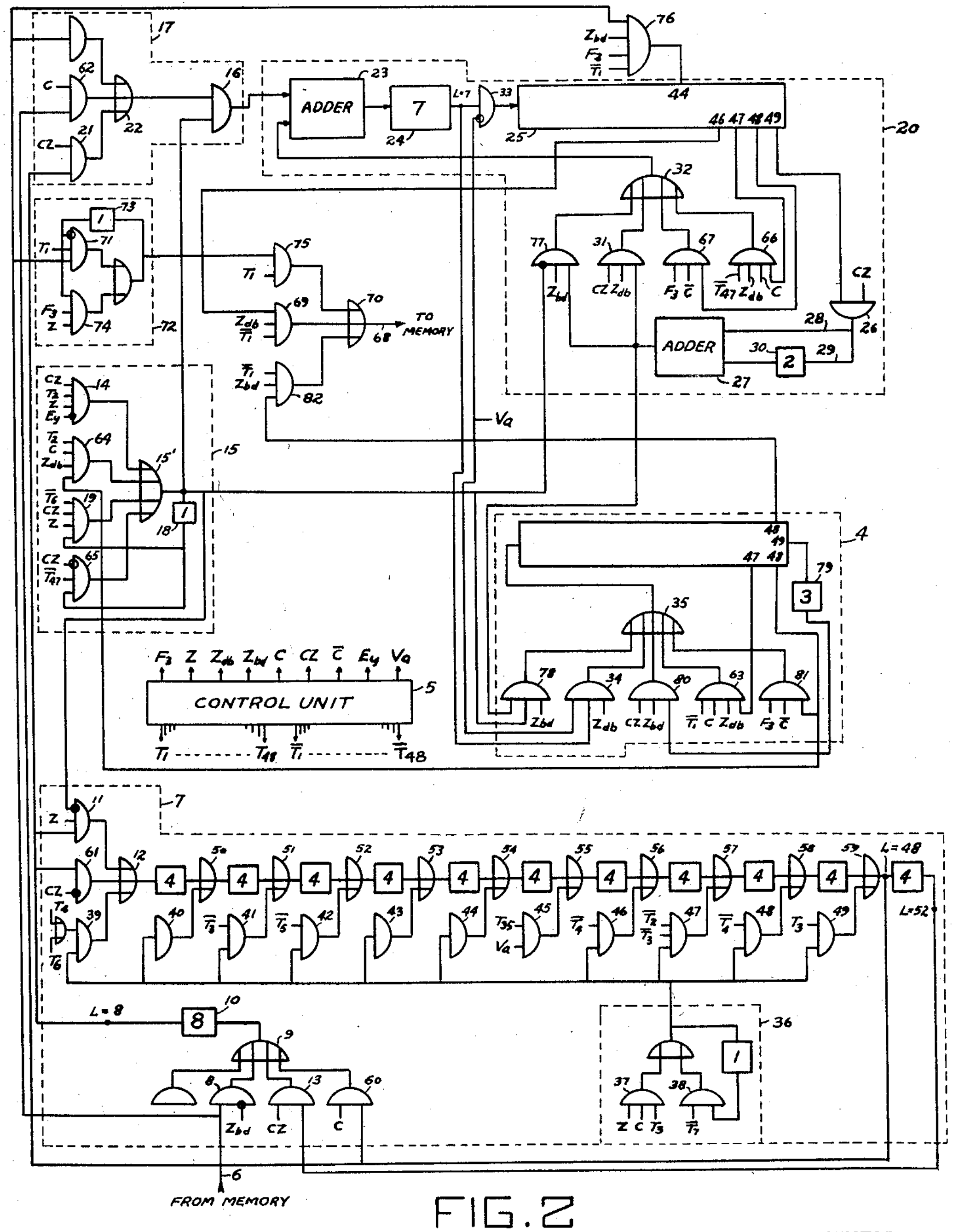

(Granted under Title 35, U.S. Code (1952), sec. 266)

The invention described herein may be manufactured and used by or for the Government for governmental purposes without payment to me of any royalty thereon.

In automatic digital computers numbers are usually introduced into and read out of the computer in binary coded decimal form. Since the computer works with true binary numbers it is necessary to provide means in the computer for converting binary coded decimal numbers into true binary numbers and for converting true binary numbers back into binary coded decimal numbers.

It is the object of this invention to provide apparatus for effecting the above conversions that is very rapid in operation and that requires the addition of a very small amount of equipment to the arithmetic unit of the computer.

Any $n$-digit decimal number may be represented in binary coded decimal form with all digits to the right of the binary point as follows:

(1) $N_d = a_1 2^{-4} + a_2 2^{-8} + a_3 2^{-12} \ldots a_n 2^{-4n}$ in which $a_1 \ldots a_n$ are the decimal digits, $a_1$ being the most significant, represented as 4-place binary numbers. For example, with $n=5$ the decimal number 926 (00926) in accordance with Equation 1 becomes (2) $(0000)2^{-4} + (0000)2^{-8} + (1001)2^{-12} + (0010)2^{-16} + (0110)2^{-20}$ or (3) .00000000100100100110

Numbers are read into the computer in the form shown at (3).

Any $n$-digit decimal number may be represented by a binary number with all digits to the right of the binary point as follows:

(4) $N_b = a_1(10^{-1}) + a_2(10^{-2}) + a_3(10^{-3}) \ldots a_n(10^{-n})$ in which $a_1 \ldots a_n$ are the digits of the decimal number, $a_1$ being the most significant, expressed as 4-place binary numbers, and in which $(10^{-1}) \ldots (10^{-n})$ are each expressed in binary form.

Equation 4 may be written in the following equivalent form:

(5) $N_b = 10^{-n}[a_1 10 + a_2) 10 + a_3) 10 \ldots + a_{n-1}) 10 + a_n]$

This equation forms the basis for the decimal-to-binary conversion. By inspection it is seen that the conversion of a decimal number into a binary number may be accomplished by multiplying $a_1$ by 10 and adding $a_2$, multiplying the resulting sum by 10 and adding $a_3$, and so on through the decimal number until $a_n$ has been added. The final sum is then multiplied by $10^{-n}$ to produce the required binary number. As in Equation 4, $a_1 \ldots a_n$, 10 and $10^{-n}$ all represent equivalent binary numbers.

The electrical code with which the converter is designed to operate is a serial code, i.e. one in which the pulses representing a binary number occur in succession rather than simultaneously as in a parallel code. Shifting a binary number to the left one place multiplies it by 2. Similarly, delaying a serial binary code by one pulse interval multiplies the number by 2 and, in general, delaying by $n$ pulse intervals multiplies the number by $2^n$. It follows from this that if a serial binary code is applied to two circuits, in one of which it is delayed by one pulse interval effecting a multiplication by 2, and in the other of which it is delayed by three pulse intervals effecting a multiplication by 8, and the products are added, the result will be multiplication by 10. This principle is utilized in the converter for producing the required multiplications by 10.

The binary number $10^{-n}$ may be stored, since it is a constant for any given converter, or it may be generated each time in the converter, as desired. The product of this number (multiplicand) and the binary number represented by the bracketed part of Equation 5 (multiplier) is achieved in a conventional manner by sampling each digit of the multiplier starting with the least significant, shifting the multiplicand one place to the left for each sampled digit and adding the shifted multiplicand to the partial product when the sampled digit is 1.

The decimal-to-binary conversion process, therefore, converts a binary coded decimal number, such as shown at (3) and which number is the source of $a_1 \ldots A_n$, into a true binary number as represented by Equations 4 and 5.

The binary-to-decimal conversion is based on Equation 4. By inspection it is apparent that multiplication of the binary number represented in this equation by 10 produces $a_1$ which may then be separated from the remainder. Similarly, multiplication of the remainder by 10 produces $a_2$, multiplication again by 10 produces $a_3$ and so on until the final multiplication by 10 produces the least significant digit $a_n$. Since $a_1 \ldots a_n$ are binary numbers corresponding to decimal digits the result is a binary coded decimal number corresponding to the original binary number. The required multiplications by 10 are achieved in the same manner and by the same apparatus as described above for the decimal-to-binary conversion.

Figure 1:
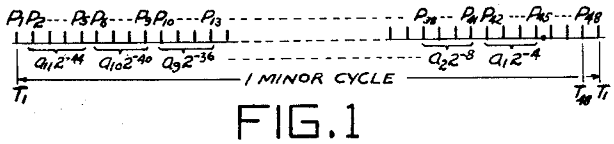

A more detailed description of the invention will be given in connection with the specific embodiment thereof shown in the accompanying drawing in which Fig. 1 illustrates the form in which numbers occur in the converter, and Fig. 2 is a block diagram of the converter.

The specific converter to be described is designed for operation with serial binary codes in the form of electrical pulse trains in which the pulse repetition rate is one megacycle per second. All number words must each be contained within a fixed period of 48 microseconds. This period is termed a minor cycle and is illustrated in Fig. 1. A minor cycle consists of 48 instants of time with a separation of one microsecond and designated $T_1$–$T_{48}$. One microsecond after $T_{48}$, $T_1$ repeats and marks the beginning of a new minor cycle. The binary digits $P_1$–$P_{48}$, occurring at $T_1$–$T_{48}$ in Fig. 1, may each be a 1, represented by an electrical pulse, or a 0, represented by the absence of a pulse. The digit $P_1$ represents the sign of the number, being 0 for a positive number and 1 for a negative number, and the 44 digits $P_2$ to $P_{45}$, inclusive, respresent its absolute value. $P_2$ is the least significant digit while $P_{45}$ is the most significant digit and is positioned next to the binary point. Remaining digits $P_{46}$–$P_{48}$ are not utilized and therefore are in effect 0.

The 44-digit number represented by digits $P_2$–$P_{45}$ may be a true binary number or it may be a binary coded decimal number of the form shown earlier at (1) and (3). In the case of a binary coded decimal number the locations of the binary coded decimal digits $a_1$–$a_{11}$ are also shown in Fig. 1. The negative power of 2 by which these digits are multiplied determines their positions relative to the binary point.

A schematic diagram of the converter circuit in block form is shown in Fig. 2. In this diagram only the gating means, the delay means and the binary adders necessary in the number conversion process are illustrated. Further, it is assumed that the only delays in the system are those occurring in the designated delay blocks. The illustrated circuit therefore differs from a practical circuit in that in the latter case it would be necessary to provide sufficient amplification at various points in the circuit to insure adequate signal levels, and the inherent delays produced by the various elements of the circuit such as amplifiers, gates, adders, etc., would have to be taken into account in the design of the delay elements. However, since these are merely matters of circuit design they are ignored in Fig. 2 in order to more clearly and simply illustrate the conversion process.

The gating means are illustrated in Fig. 2 as semicircular blocks with the output line extending from the curved side and the input lines entering through the straight side. Two types of gates, designated in the computer art as "and" gates and "or" gates, are used. The construction and operation of such gates are well understood and are described in the literature such, for example, as the Computer Issue of the Proceedings of the Institute of Radio Engineers, vol. 41, No. 10, October 1953, pages 1300–1313 and 1381–1387. These gates may be realized in different ways, the construction of the gate being immaterial in Fig. 2 provided the desired function is performed. Briefly, an "and" gate is one in which an input must appear simultaneously on each of the input lines in order for an output to be produced, and an "or" gate is one in which an input on one or more of the input lines will produce an output. Gate 19 is an example of an "and" gate and gate 15′ is an example of an "or" gate. The two are distinguished by having the input lines stop at the straight side in the case of an "and" gate and extend through to the curved side in the case of an "or" gate. An "and" gate may also be of the inhibited type, an example of which is gate 65. In this type the inhibit input line is designated by a small circle at the point where the line touches the straight side. In the case of the inhibited "and" gate, an output is produced only in the presence of signals on all input lines except the inhibiting input line. A signal on the inhibiting line prevents an output under any condition.

The adders shown in Fig. 2 may be of any suitable type capable of adding binary numbers represented by successively occurring electrical pulses. The design of such adders is likewise well known in the art.

The operation of the converter circuit is governed by a number of control voltages generated by the control unit 5. This unit operates in accordance with the instructions inserted into the computer with the particular problem to generate control voltages for regulating the operation of the various units of the computer. Only those control voltages concerned with the conversion process are shown in Fig. 2. The voltages are defined as follows:

$F_3$—A train of one megacycle pulses on for one major cycle of operation of the computer during which the complete conversion process is performed. Composed of a plurality of 48 microsecond minor cycles.

Z—A train of one megacycle pulses on during any number conversion.

$Z_{db}$—A train of one megacycle pulses on during decimal-to-binary conversion.

$Z_{bd}$—A train of one megacycle pulses on during binary-to-decimal conversion.

CZ—A train of one megacycle pulses on for the first 12 minor cycles of $F_3$.

C—A train of one megacycle pulses on from the 13th through the 56th minor cycle of $F_3$ for decimal-to-binary conversion, and from the 1st through the 12th minor cycle of $F_3$ for binary-to-decimal conversion.

$\bar{C}$—A train of one megacycle pulses on except when CZ or C are on.

$E_y$—A train of 48 one megacycle pulses on during the 1st minor cycle of $F_3$.

$V_a$—A train of 48 one megacycle pulses on during the 12th minor cycle of $F_3$.

$T_1$–$T_{48}$—Each line has one pulse per minor cycle occurring at the time indicated.

$\bar{T}_1$–$\bar{T}_{48}$—Each line has all the 48 pulses occurring in each minor cycle except the pulse at the time indicated.

The above described control voltages are applied to various gating circuits in Fig. 2 as indicated by legends. The operation of Fig. 2 is as follows:

*Decimal-to-binary conversion*

The decimal number to be converted to a binary number is received in binary coded decimal form. This number arrives from the memory of the computer on line 6 and is timed such that the pulses $P_1$–$P_{48}$ occupy the times $T_1$–$T_{48}$ as illustrated in Fig. 1. During the 1st minor cycle this number enters the multiplicand loop 7 through gate 8, $Z_{bd}$ being off for decimal-to-binary conversion. This loop has a length of 52 microseconds and may be traced through gate 9, delay 10, gate 11, gate 12, thence through eleven consecutive 4 microsecond delay sections to gate 13 and through this gate back to gate 9. The number circulates in this loop.

At time $T_2$ of each minor cycle a pulse is applied from the control unit 5 to gate 14 in input gate activating pulse generator 15. However, this generator is not activated during the 1st minor cycle because of the inhibiting action of $E_y$. At $T_2$ of the 2nd minor cycle, $E_y$ now being off, the applied pulse passes through gates 14 and 15′ to gate 16 in the accumulator loop input gate circuit 17. The pulse occurring in the output of gate 15′ also travels around a loop, consisting of 1 microsecond delay 18 and gate 19, back to gate 15′ appearing in the output circuit of this gate at $T_3$. By this process generator 15 continues to generate pulses at 1 microsecond intervals until stopped by opening the feedback loop, which occurs at $T_6$ by the absence of a pulse on the $\bar{T}_6$ line of gate 19. The generator 15 therefore operates during the 2nd minor cycle to apply 4 pulses to gate 16 at times $T_2$, $T_3$, $T_4$ and $T_5$.

At $T_2$ of the 2nd minor cycle the binary coded decimal number has been circulating in the multiplicand loop 7 for 49 microseconds, it having entered the loop at $T_1$ of the 1st minor cycle. Therefore, at $T_2$ of the 2nd minor cycle pulse $P_{42}$ of this number is at point $L=8$ of the multiplicand loop and is followed by pulses $P_{43}$, $P_{44}$ and $P_{45}$ at $T_3$, $T_4$ and $T_5$, respectively. These four pulses therefore enter accumulator loop 20 through gates 21, 22 and 16, and adder 23. At the same time pulses $P_{42}$–$P_{45}$ are erased from the loop 7 by the inhibiting action of the four pulses from the generator 15 on gate 11. As seen in Fig. 1, pulses $P_{42}$–$P_{45}$ represent the binary number $a_1$, and since they enter the accumulator loop at times $T_2$–$T_5$ they appear in this loop as the binary number $a_1 \cdot 2^{-44}$.

The accumulator loop contains a maximum of 49 microseconds of delay produced by a 7 microsecond section 24 and a 42 microsecond section 25. The binary number $a_1 \cdot 2^{-44}$ travels down this delay path coming out of the 49 microsecond tap at $T_3$–$T_6$ of the 3rd minor cycle. The shift from the position $T_2$–$T_5$ to the position $T_3$–$T_6$, resulting from the one microsecond difference between the 49 microsecond delay and the 48 microsecond minor cycle period, moves the number one place nearer the binary point (Fig. 1) which effectively multiplies it by 2. The binary number therefore now becomes $2a_1 \cdot 2^{-44}$. This number is applied through gate 26 to adder 27 by way of line 28 and also by way of line 29 containing a 2 microsecond delay 30. The 2 microsecond delay in effect shifts $2a \cdot 2^{-44}$ from $T_3$–$T_6$ to $T_5$–$T_8$ which effectively multiplies it by 4. The binary numbers applied to adder 27, therefore, are $2a \cdot 2^{-44}$ and $8a \cdot 2^{-44}$ which added produce $10a_1 \cdot 2^{-44}$ with the least significant digit occurring at $T_3$ of the third minor cycle. This sum is applied through gates 31 and 32 to the adder 23.

The operation of generator 15 during the 3rd minor cycle is the same as during the 2nd minor cycle, its action being initiated by a $T_2$ pulse at gate 14 and terminated by the absence of a pulse at $T_6$ on the $\bar{T}_6$ line of gate 19, with the result that four pulses are applied to gate 16 at $T_2$–$T_5$. Since the 52 microsecond multiplicand loop produces a delay 4 microseconds greater than a minor cycle period, the number circulating in this loop is shifted 4 places each minor cycle. Therefore, whereas pulses $P_{42}$–$P_{45}$ representing the binary number $a_1$ appeared at point $L=8$ at times $T_2$–$T_5$ of the 2nd minor cycle, pulses $P_{38}$–$P_{41}$ representing the binary number $a_2$ appear at $L=8$ at times $T_2$–$T_5$ of the 3rd minor cycle. These pulses are applied through gates 21 and 22 to gate 16 and, since this gate is open from $T_2$–$T_5$ because of the four pulses applied thereto from generator 15, the pulses representing $a_2$ pass through gate 16 to adder 23. Since these pulses occur at $T_2$–$T_5$ of the minor cycle they represent the binary number $a_2 \cdot 2^{-44}$.

Therefore, during the 3rd minor cycle, adder 23 has applied to it the binary number $a_2 \cdot 2^{-44}$ having its least significant digit at $T_2$ and the binary number $10a_1 \cdot 2^{-44}$ having its least significant digit at $T_3$. These numbers are added to produce the binary number $(10a_1+a_2)2^{-44}$ having its least significant digit at $T_2$.

This sum enters the accumulator loop from adder 23 where it is multiplied by 10 in the same manner as $a_1 \cdot 2^{-44}$ was multiplied by 10 during the 2nd minor cycle. As a result the binary number $(10a_1+a_2)10 \cdot 2^{-44}$, having its least significant digit at $T_3$ of the 4th minor cycle, appears at the output of adder 27 and is applied through gates 31 and 32 to the input of adder 23. Also, by the process already described for $a_1$ and $a_2$, the binary number $a_3 \cdot 2^{-44}$ is applied to adder 23 at $T_2$–$T_5$ of the 4th minor cycle. The output of the adder in this minor cycle, therefore, is the binary number $$[10a_1+a_2)10+a_3]2^{-44}$$

having it least significant digit at $T_2$.

The above described operations continue until eventually the binary number $$[10a_1+a_2)10+a_3)10+a_4)10+a_5)10+a_6)10 +a_7)10+a_8)10+a_9)10+a_{10})10+a_{11}]2^{-44}$$

appears at the output of adder 23 in the 12th minor cycle. This number has its least significant digit at $T_2$ of the 12th minor cycle, or, in other words, its least significant digit is located 44 places from the binary point, as may be seen by reference to Fig. 1. The number of binary places required to provide a binary number equal to the maximum value of an $n$-digit decimal number is the smallest whole number that exceeds $n/\log 2$. Therefore, for the example given where $n=11$, the number of binary places is 37. Since the bracketed part of the number can never amount to more than 37 binary places it is desirable for maximum accuracy to shift this number 7 binary places toward the binary point so that its most significant digit is adjacent to the binary point. This is accomplished by removing the number from the accumulator loop at the point $L=7$ which causes the least significant digit to then occur at $T_9$ and the most significant digit at $T_{45}$ of the 12th minor cycle, so that the number becomes $$[10a_1+a_2)10+a_3 \cdots +a_{10})10+a_{11}]2^{-37}$$

The removal process is as follows:

The control voltage $Va$, a train of 48 one megacycle pulses, is on from $T_1$–$T_{48}$ of the 12th minor cycle. These pulses inhibit gate 33 during this interval and thereby prevent the binary number $$[10a_1+a_2)10 \cdots a_{11}]2^{-37}$$

which extends from $T_9$–$T_{45}$ of the 12th minor cycle, from traveling farther into the accumulator loop. This action erases the accumulator loop. At the same time $Va$ opens gate 34 of the multiplier loop 4 and allows the number to enter this loop through gates 34 and 35.

The bracketed part of the number removed from the accumulator loop and admitted to the multiplier loop corresponds to the bracketed part of Equation 5 for $n=11$. In order to produce the binary number represented by Equation 5 the number must be multiplied by the binary equivalent of $10^{-11} \cdot 2^{37}$. This number is generated in the multiplicand loop 7.

The binary number representing the quantity $10^{-11}$ is (6) $10^{-11}$=.000 000 000 *AFE BFF OBC B24* 7

This number is written in hexadecimal notation in which each hexadecimal digit represents a four-place binary number as follows:

| | |
|---|---|
| 0=0000 | 8=1000 |
| 1=0001 | 9=1001 |
| 2=0010 | *A*=1010 |
| 3=0011 | *B*=1011 |
| 4=0100 | *C*=1100 |
| 5=0101 | *D*=1101 |
| 6=0110 | *E*=1110 |
| 7=0111 | *F*=1111 |

The above binary equivalent of $10^{-11}$ therefore has 88 binary digits the first 36 of which are zeros and the 37th of which is 1, so that Equation 6 may also be written as (7) $10^{-11}$=(1.5*FD* 7*FE* 179 648)$2^{-37}$ Consequently, (8) $10^{-11} \cdot 2^{37}$=1.5*FD* 7*FE* 179 648

The only difference between the binary numbers of (8) and (6) is in the location of the binary point, the significant binary digits in the two numbers being the same. Therefore, generation of the binary number

AFE BFF OBC B24 7 in the multiplicand loop, with due regard for the binary point, effectively inserts $10^{-11} \cdot 2^{37}$ into the loop. Actually only AFE BFF OBC B2 is inserted because binary numbers in the specific converter described are limited to 44 digits.

Pulse generator 36 controls the generation of $10^{-11} \cdot 2^{37}$ in the multiplicand loop. The operation of this generator is similar to that of generator 15, its action being initiated by a pulse at $T_3$ at gate 37, C being on the 13th through the 56th minor cycles, and terminated by the absence of a pulse at $T_7$ on the $\bar{T}_7$ line of gate 38. Therefore, in the 13th minor cycle, generator 36 produces four pulses occurring at $T_3$–$T_6$. These pulses are applied simultaneously to gates 39–49, with the exception of gate 45, and provide the four possible pulses necessary to generate each binary group represented by a hexadecimal digit. For example, pulses at $T_4$ and $T_6$ pass gate 39 and serve to insert the binary group A(1010) into the loop through gate 12, all four pulses pass gate 40 and serve to insert the binary group F(1111) in the loop through gate 50, pulses at $T_4$, $T_5$ and $T_6$ pass gate 41 and serve to insert the binary group E(1110) in the loop through gate 51, and so on for the remainder of the groups, the last group 2(0010) being inserted through gate 59.

Therefore, during the interval $T_3$–$T_6$ of the 13th minor cycle, the binary number AFE BFF OBC B2 is generated in the multiplicand loop and subsequently circulates around a 48 microsecond loop that may be traced from gate 59 through gate 60, gate 9, delay 10 and gate 61 to gate 12. Since the loop delay is the same as a minor cycle period, at $T_3$–$T_6$ of the 14th and subsequent minor cycles the number will be in the same position in the loop as when generated in the 13th minor cycle. Also, it will be noted that the number is regenerated at $T_3$–$T_6$ of the 14th and subsequent minor cycles. However, since the circulating number and the generated numbers are always in synchronism, this regeneration, though unnecessary, does no harm and therefore no provision need be made to prevent it.

Since the binary number in the multiplicand loop is limited to 44 places and since the binary point is located between the two most significant digits, as seen in Equation 8, the least significant digit must occur at $T_3$. This condition is satisfied in the multiplicand loop since at $T_3$ of each minor cycle the least significant digit is at point $L=48$ of the loop. The point $L=48$ is connected through gates 62 and 22 to gate 16 of the accumulator loop input gate circuit. Therefore, as each digit of the number in the multiplicand loop reaches $L=48$ it is applied at the same instant to gate 16.

It is desirable that the least significant digit of the number in the multiplicand loop be rounded off to equal 1. The action to accomplish this is initiated during the 12th minor cycle at gate 55. The associated gate 45 does not receive pulses from generator 36 in the generation of the number since the corresponding hexadecimal digit is 0 and the corresponding binary group (0000) is therefore generated by the absence of the four pulses of generator 36. Instead, the $T_{35}$ and V*a* lines are applied to gate 45. Consequently at $T_{35}$ of the 12th minor cycle a pulse is inserted in the multiplicand loop at gate 55 and, after 16 microseconds delay, reaches point $L=48$ at $T_3$ of the 13th minor cycle. Since the least significant digit of the binary number is generated at this point of the loop at $T_3$, the presence of the round-off digit 1 at $L=48$ at this time insures that the least significant digit will be 1. By circulating around the 48 microsecond loop the round-off digit also appears at point $L=48$ at $T_3$ of the 14th and subsequent minor cycles until the loop is cleared.

As already explained, the multiplier, which is the binary number $$[10a_1+a_2)10+a_3 \ldots a_{10})10+a_{11}]2^{-37}$$

has 37 digits, $P_9$–$P_{45}$, the least significant of which $P_9$ entered the multiplier loop through gates 34 and 35 at $T_9$ of the 12th minor cycle. The multiplier circulates around the multiplier loop through the 47 microsecond tap, gate 63 and gate 35. The multiplying process, as will be seen later, is concerned with the digit appearing at the 48 microsecond tap at $T_2$ of each minor cycle. Since the least significant digit of the multiplier is $P_9$, digits $P_2$–$P_8$ may in effect be considered 0. Further, due to the fact that the loop delay of 47 microseconds is one microsecond less than the minor cycle period, the digit seen at the 48 microsecond tap moves one place nearer the binary point for each minor cycle. Therefore, at $T_2$ of the 13th through the 19th minor cycles no output occurs since digits $P_2$–$P_8$ are in effect 0 as stated.

At $T_2$ of the 20th minor cycle the least significant digits $P_9$ of the multiplier occurs, to be followed by the remaining digits through $P_{45}$ at $T_2$ of the 21st through the 56th minor cycles, respectively.

The pulse generator 15 samples the digits of the multiplier at the 48 microsecond tap of the multiplier loop and, for each of these digits that is a 1, admits the binary number in the multiplicand loop, hereinafter referred to as the multiplicand, into the accumulator loop. Generator 15 is started by a pulse admitted to gate 15' through gate 64 at $T_2$ of each minor cycle, provided there is also an output at the same time from tap 48 of the multiplier loop. Once started the generator operates until stopped at $T_{47}$ by the absence of a pulse on the $\bar{T}_{47}$ line of gate 65 in the feedback loop, the result being a train of 45 one megacycle per second pulses extending from $T_2$–$T_{46}$ which are applied to gate 16. Since the multiplicand appears at the input of gate 16 by way of gates 62 and 22 during the period $T_3$–$T_{46}$ of each minor cycle, the simultaneous occurrence of the pulses from generator 15 serves to gate the multiplicand into the accumulator loop through adder 23.

The multiplying process can best be understood by considering the first few cycles of its operation. As stated above, digits $P_2$–$P_8$ of the multiplier are in effect 0 and therefore the sampled digit is zero during minor cycles 13 through 19. Assuming $P_9$ of the multiplier to be 1, the multiplicand is applied to adder 23 at $T_3$–$T_{46}$ of the 20th minor cycle. Since the accumulator loop is cleared at the start, the first partial product formed at the output of the adder is the same as the multiplicand. This partial product circulates out of the 47 microsecond tap of the accumulator loop and through gates 66 and 32 to the input of the adder, arriving at the input to gate 66 and at the adder input at times $T_2$–$T_{45}$ of the 21st minor cycle. The effect of the 47 microsecond loop, therefore, is to shift the digits of the partial product to time positions one microsecond earlier than they occupied in the preceding minor cycle, or one place to the left as referred to the time base illustrated in Fig. 1, the most significant digit now occurring at $T_{45}$.

Assuming the second least significant digit $P_{10}$ of the multiplier to also be 1, the multiplicand is again applied to adder 23 at $T_3$–$T_{46}$ of the 21st minor cycle. Here the multiplicand, having its most significant digit at $T_{46}$, is added to the shifted first partial product the most significant digit of which is at $T_{45}$. The most significant digit of the sum, or second partial product, occurs at $T_{47}$. The second partial product, after having been shifted one place to the left by circulating through the 47 microsecond loop, is applied to adder 23, at which its most significant digit occurs at $T_{46}$ of the 22nd minor cycle.

Therefore in the 22nd minor cycle, assuming the third least significant digit $P_{11}$ of the multiplier to also be 1, the most significant digits of both the multiplicand and the shifted partial product are applied to the adder at $T_{46}$. Since the most significant digit of the sum of two binary numbers can never be more than one place higher than the most significant digit in the two numbers, the most significant digit of the third partial product at the output of adder 23 can not occur later than $T_{47}$. By similar reasoning it is apparent that the most significant digit of any partial product, or of the final product, at the output of adder 23 can not occur later than $T_{47}$. Therefore, the time positions of the 44 digits $P_2$–$P_{45}$ of the final product, as they appear at the output of adder 23, are established as $T_4$–$T_{47}$, respectively.

In the above example, each multiplier digit was assumed to be 1 in order to establish the latest possible time position of the most significant digit in the output of adder 23. In actual practice various of the multiplier digits are 0, but in those minor cycles in which the sampled digit is 0 the only difference in operation is that the multiplicand is not applied to adder 23.

As the partial products increase in length during the multiplying process the least significant digit will eventually occur at $T_{48}$. Since the digit at $T_{48}$ in the output of adder 23 after circulating through the 47 microsecond loop would normally appear at the input of this adder at $T_{47}$, it would constitute a source of error in the most significant digit which also occurs at $T_{47}$. In order to prevent this, gate 66 is closed at $T_{47}$ by the absence of a pulse on its $\bar{T}_{47}$ line thus preventing the appearance of a 1 in the shifted partial product at $T_{47}$.

As stated above, the 44 digits $P_2$–$P_{45}$ of the final product appear at the output of adder 23 at $T_4$–$T_{47}$, respectively. This first occurs in the 56th minor cycle. At the end of this cycle C goes off and $\bar{C}$ goes on breaking the 47 microsecond circuit of the accumulator loop at gate 66 and completing a 48 microsecond circuit at gate 67 through which the product continues to circulate. Therefore, as viewed at the output of adder 23, the 44 digits $P_2$–$P_{45}$ of the final product occur at $T_4$–$T_{47}$, respectively of each subsequent minor cycle as long as the number continues to circulate in the accumulator loop. The remaining digits $P_{46}$, $P_{47}$, $P_{48}$ and $P_1$, occurring at $T_{48}$, $T_1$, $T_2$ and $T_3$, respectively, are zeros due to the action of the $\bar{T}_{47}$ line of gate 66.

In the multiplier loop, each digit sampled at the 48 microsecond tap at $T_2$ appeared at the input to gate 63 at $T_1$ and was therefore removed from the loop due to the absence of a pulse at $T_1$ on the $\bar{T}_1$ line of gate 63. As a result, the multiplier loop is clear when C goes off and closes gate 63 at the end of the 56th minor cycle.

The digits of the product are those of the desired binary number, expressed by Equation 5, except for the position of the binary point which is now situated between $P_{43}$ and $P_{44}$. The position of the binary point can be controlled by an appropriate choice of the exit of the number from the accumulator loop. Accordingly, by removing the number at the 46 microsecond tap it is shifted 2 microseconds in time so that the digits $P_2$–$P_{45}$ occur at $T_2$–$T_{45}$, respectively. This places the binary point between $P_{45}$ and $P_{46}$ as shown in Fig. 1.

The binary number passes from the accumulator loop through gates 69 and 70 to line 68 leading to the computer memory. Gate 70 also serves to insert the proper sign digit $P_1$ at $T_1$ as follows: The incoming binary coded decimal number on line 6 is applied to gate 71 of sign pulse generator 72. If the incoming number is negative its sign digit $P_1$, occurring at $T_1$, is 1. The occurrence of a pulse at $T_1$ initiates operation of generator 72 through gate 71 which generates a train of one megacycle pulses as a result of the feedback occurring through one microsecond delay 73 and gate 74. This train of pulses is applied to gate 75. Therefore, if generator 72 is operating at the time the binary number is being gated from the accumulator loop, the digit 1 is inserted at $T_1$ through gate 75. Had the original number on line 6 been positive, its sign digit $P_1$ would have been 0 and generator 72 would not have started. As a result, no pulse would have been applied through gate 75 to line 68 and the sign digit $P_1$ would have remained 0 indicating a positive number.

The binary number is repeated on line 68 each minor cycle until $F_3$ goes off stopping generator 72 at gate 74 and clearing the accumulator loop at gate 67.

*Binary-to-decimal conversion*

As stated before hand, the conversion of a binary number to a binary coded decimal number is based on Equation 4. In the specific converter shown $n$ again is 11 and the binary number to be converted is received in the form shown in Fig. 1, in which $P_1$ is the sign digit and $P_2$–$P_{45}$ are the significant digits of the number, $P_{45}$ being the most significant. These digits occur at $T_1$–$T_{45}$ so that they all appear to the right of the binary point, which occurs between $T_{45}$ and $T_{46}$. Digits $P_{46}$–$P_{48}$ are not utilized in the received number and are in effect 0. As in the case of the decimal-to-binary conversion, the conversion process takes place in the major cycle of operation designated as $F_3$. The other control voltages that must be on are Z, $Z_{db}$, CZ and C, the last being on in this case from the first through the 12th minor cycle of $F_3$. Again, $\bar{C}$ is on except when CZ or C is on.

During the 1st minor cycle of $F_3$ the binary number enters the accumulator loop at the 44 microsecond tap through gate 76, the sign digit being erased here by $\bar{T}_1$. In the accumulator loop the number travels around a 49 microsecond circuit including gate 26, adder 27, gate 77, gate 32 and adder 23. The most significant digit $P_{45}$ of the binary number arrives at the 48 microsecond tap at $T_1$ of the 2nd minor cycle. The binary number in traveling from the 48 microsecond tap to the 49 microsecond tap and thence through gate 26 and adder 27 is multiplied by 10 through a process already explained in connection with the decimal-to-binary conversion. The result of multiplying the binary number by 10 is apparent from Equation 4. The right hand side of this equation represents the binary number introduced into the accumulator loop. Multiplying this number by 10 gives $$a_1+a_2 10^{-1}+a_3 10^{-2} \ldots a_n 10^{(1-n)}$$

This represents a binary number the four most significant digits of which constitute $a_1$. Therefore the four most significant digits in the output of adder 27 represent the most significant decimal digit.

These four digits, which will constitute the digits $P_{42}$–$P_{45}$ of the desired binary coded decimal number, appear in the output of adder 27 at $T_2$–$T_5$ of the 2nd minor cycle and are removed from the accumulator loop and inserted in the multiplier loop through the action of gates 77 and 78, which are controlled by pulse generator 15. Although the last digit in the output of delay 30 occurs at $T_4$, the possibility of a final carry places the latest possible occurrence of a digit in the output of the adder at $T_5$. Pulse generator 15, which is turned on by the $T_2$ pulse on gate 64 and off by the absence of a pulse at $T_6$ on the $\bar{T}_6$ line of gate 19 produces four pulses at $T_2$–$T_5$ of each minor cycle. By inhibiting gate 77 and opening gate 78 these four pulses remove the $a_1$ digits from the accumulator loop and insert them in the multiplier loop. Since the $a_1$ digits enter the multiplier loop at $T_2$–$T_5$, the multiplier loop contains during the 2nd minor cycle the number $a_1 \cdot 2^{-44}$.

During the 2nd minor cycle the most significant digit in the remainder $$a_2 10^{-1}+a_3 10^{-2} \ldots a_n 10^{(1-n)}$$

appears at the output of adder 27 at $T_1$ and is the last pulse to pass gate 77 before it is closed at $T_2$. This digit reaches the 48 microsecond tap at $T_1$ of the 3rd minor cycle. By the same process described above for the original binary number, the remainder is multiplied by 10 and appears at the output of the adder as the binary number $$a_2+a_3 10^{-1}+a_4 10^{-2} \ldots +a_n 10^{(2-n)}$$

The four digits of $a_2$, like those of $a_1$, occur at $T_2$–$T_5$ of the 3rd minor cycle and are removed from the accumulator loop and inserted in the multiplier loop in a similar manner, appearing in the latter as the number $a_2 \cdot 2^{-44}$.

During the 2nd minor cycle the number $a_1 \cdot 2^{-44}$ in the multiplier loop circulated through a 52 microsecond path, including the 49 microsecond tap, 3 microsecond delay 79 and gate 80, shifting it so that its four digits occur at $T_6$–$T_9$ of the 3rd minor cycle and become the number $a_1 \cdot 2^{-40}$. The number in the multiplier loop during the third minor cycle, therefore, is $$a_1 \cdot 2^{-40}+a_2 \cdot 2^{-44}$$

The above process continues until in the 11th minor cycle the remainder in the accumulator loop is $a_{11}10^{-1}$ and the number in the multiplier loop is $$a_1 \cdot 2^{-8}+a_2 \cdot 2^{-12} \ldots +a_{10} 2^{-44}$$

The subsequent multiplication of $a_{11}10^{-1}$ by 10 in the 12th minor cycle produces the four digits of $a_{11}$ at $T_2$–$T_5$ of this cycle which are gated into the multiplier loop and become $a_{11}\cdot 2^{-44}$. The number in the multiplier loop therefore becomes, in the 12th minor cycle, $$a_1\cdot 2^{-4}+a_2\cdot 2^{-8}+a_3\cdot 2^{-12}\ .\ .\ .\ +a_{11}\cdot 2^{-44}$$

This corresponds to the number given by Equation 1 for $n=11$ and is the desired binary coded decimal number.

The least significant digit of this number appears at the input of the multiplier loop, i.e. at gate 35, at $T_2$ of the 12th minor cycle. Therefore at $T_2$ of the 13th minor cycle this digit is at the 48 microsecond tap. At the end of the 12th minor cycle CZ and C go off and $\bar{C}$ goes on. Removal of CZ closes gates 14 and 19 of pulse generator 15, preventing further operation of this unit, and also closes gate 80 of the multiplier loop preventing further circulation around the 52 microsecond path. At the same time $\bar{C}$ opens gate 81 and permits circulation through this gate around a 48 microsecond path. The binary coded decimal number therefore continues to circulate in the multiplier loop until the end of $F_3$, the digits $P_2$–$P_{45}$ appearing at the 48 microsecond tap at $T_2$–$T_{45}$ of each minor cycle.

From the 48 microsecond tap the number is applied through gates 82 and 70 to line 68 and thence to the computer memory. The proper sign digit $P_1$ is inserted by generator 72 and gate 75 in the same manner as explained in connection with the decimal-to-binary conversion.

I claim:

1. Apparatus for converting a binary coded $n$-digit decimal number into a true binary number, said numbers being in the form of a serial pulse code having a fixed digit interval and being containable in a fixed repeating time span, said apparatus comprising: a first delay loop having a delay exceeding said time span by four digit intervals; a two-input serial binary adder; a second delay loop connected between the output of said adder and one of its inputs, said second delay loop having a delay equal to said time span and containing means for multiplying a binary number in said form by ten; gating means connected between a predetermined delay point in said first delay loop and the other input of said adder; means for admitting said binary coded decimal number to said first delay loop during the first of said time spans; means connected to said gate and operative at the same predetermined instant in each of $n$ succeeding time spans to open said gate for four consecutive digit intervals thereby gating the four digits appearing at said predetermined point in said first delay line to said adder, said predetermined point being so located that the four pulses gated in each time span are the four most significant of the ungated pulses; and means operative during the $(n+1)^{\text{th}}$ time span for removing the binary digits occurring at a predetermined delay point in said second delay loop, said removed digits being the digits of a binary number corresponding to said binary coded decimal number.

2. Apparatus as claimed in claim 1 in which said multiplying means has an input circuit and an output circuit, said output circuit being connected to the said one input of said adder, and comprises an additional two-input serial binary adder having its output connected to the output circuit of said multiplying means, having one input connected to the input circuit of said multiplying means through a one digit interval delay element, and having the other input connected to the input circuit of said multiplying means through a two digit interval delay element and said one digit interval delay element in series.

3. Apparatus for converting a binary coded $n$-digit decimal number less than unity into a true binary number less than unity, said numbers being in the form of a serial pulse code having a fixed digit interval and being containable in a fixed repeating time span, said apparatus comprising: a first delay loop having a delay exceeding said time span by four digit intervals; a two-input serial binary added; a second delay loop connected between the output of said adder and one of its inputs, said second delay loop having a delay equal to said time span and containing means for multiplying a binary number in said form by ten; means for admitting said binary coded decimal number to said first delay loop during the first of said time spans; means connected to a predetermined point on said first delay loop and to the other input of said adder and operative at the same predetermined instant in each of $n$ succeeding time spans and for four consecutive digit intervals in each time span to erase the four digits appearing at said predetermined point from said first loop and to apply these digits to the said other input of said adder, said predetermined point being so located that the four digits removed and applied to the adder are the most significant of the digits then in the loop; a third delay loop having a delay one digit interval less than said time span; means connected to said second and third delay loops and operative during the $(n+1)^{\text{th}}$ time span to erase said second loop at a predetermined delay point and to introduce the digits appearing at said predetermined delay point into said third delay loop, said predetermined point having a delay measured from the output of said adder equal to $(4n-r)$ digit intervals where $r$ is the smallest whole number greater than $n/\log 2$; means connected to said first delay loop and operative during the $(n+2)^{\text{th}}$ time span for reducing the delay of said first loop to equal said time span; means connected to said reduced first loop and operative during the $(n+2)^{\text{th}}$ time span to generate a serial binary number in said reduced loop equal to $10^{-n}\cdot 2^{r}$; means operative during the $(n+2)^{\text{th}}$ and $(4n-1)$ subsequent time spans to remove said multiplying means from said second delay loop and to reduce the delay of said loop to one digit interval less than said time span; means connected to said other input of said adder, a predetermined point in said third delay loop and a predetermined point in said reduced first loop and operative to sample each digit of the number in said third loop in order of increasing significance and to apply the number in said reduced first loop to said other input of said adder whenever the sampled digit is a binary 1; means operative at the completion of the time span during which the last digit in said third loop is sampled to restore the delay in said reduced second loop to said time span while continuing to exclude said multiplying means, the digits circulating in said restored loop being the digits of the desired binary number; and means for removing the binary digits from said restored second delay loop at a delay point so located that the most significant digit is adjacent to and on the less-than-unity side of the binary point.

4. Apparatus as claimed in claim 3 in which said multiplying means has an input circuit and an output circuit, said output circuit being connected to the said one input of said adder, and comprises an additional two-input serial binary adder having its output connected to the output circuit of said multiplying means, having one input connected to the input circuit of said multiplying means through a one digit interval delay element, and having the other input connected to the input circuit of said multiplying means through a two digit interval delay element and said one digit interval delay element in series.

5. Apparatus for converting an $m$-digit binary number of value less than unity into a binary coded $$\frac{m}{4}$$

digit decimal number in which the value of $m$ is determined by the capacity of the apparatus, said numbers being in the form of a serial pulse code having a fixed digit interval and being containable in a fixed repeating time span, said apparatus comprising: means having an input circuit and an output circuit for multiplying a binary number in said form by ten; a first delay circuit having a delay equal to said time span connected between the output and input of said multiplying means to form a first delay loop, said delay circuit containing a first gating means as a serial element adjacent the output of said multiplying means; means operative in the first of said time spans to introduce the digits of said binary number in inverse order of significance into said first delay loop at a point in said first delay circuit having a delay measured from the output of said multiplying means that is four digit intervals less than said time span; a second delay loop having an input means and a delay four digit intervals greater than said time span; second gating means connected between the output of said multiplying means and the said input means to said second loop; gate actuating means connected to said first and second gates and operative at the same predetermined instant in each of $$\frac{m}{4}$$

suceeding time spans, to inhibit said first gate and open said second gate for four consecutive digit intervals, said predetermined instant being that instant in the time span at which the fourth most significant digit of the binary number than in said first delay loop appears at the output of said multiplying means; and means becoming operative at the next succeeding time span to reduce the delay of said second delay loop by four digit intervals, the number circulating in said reduced second delay loop being the desired binary coded decimal number.

6. Apparatus as claimed in claim 5 in which said multiplying means comprises a two-input serial binary adder having its output connected to the output circuit of said multiplying means, having one input connected to the input circuit of said multiplying means through a one digit interval delay element, and having the other input connected to the input circuit of said multiplying means through a two digit interval delay element and said one digit interval delay element in series.

References Cited in the file of this patent

UNITED STATES PATENTS

| | | |
|---|---|---|
| 2,701,095 | Stibitz | Feb. 1, 1955 |
| 2,770,797 | Hamilton et al. | Nov. 13, 1956 |
| 2,792,987 | Stibitz | May 21, 1957 |

FOREIGN PATENTS

| | | |
|---|---|---|
| 1,022,202 | France | Dec. 10, 1952 |

OTHER REFERENCES

A Functional Description of the EDVAC, Univ. of Pennsylvania, Moore School of Electrical Engineering, vol I, pages 1—1 to 1—4, 2—42 to 2—46 (total 11 pages), vol. II, Figs. 104-3LD-2, 104-10LD-6 (total 2 pages).